UNITED STATES PATENT OFFICE.

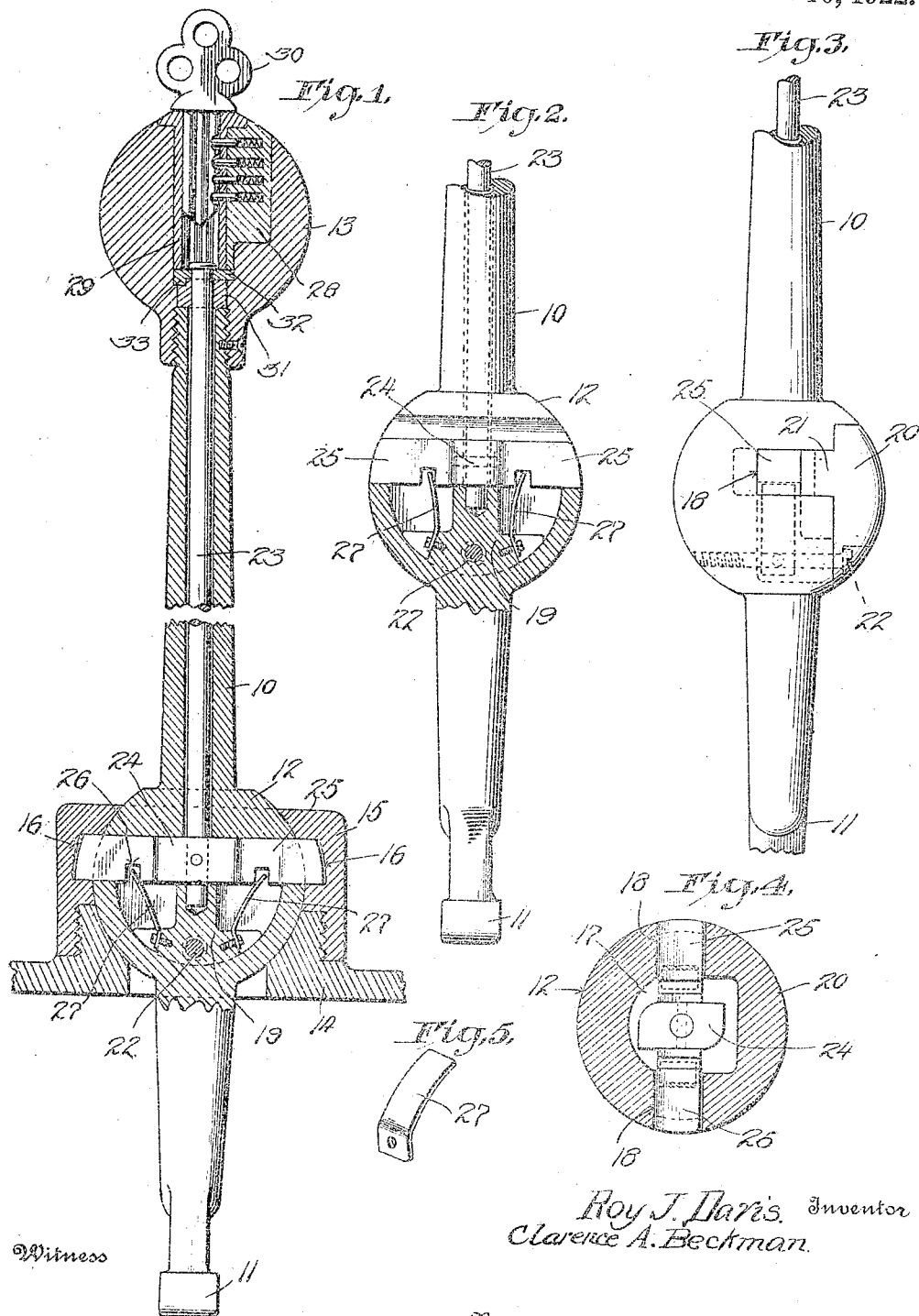

ROY J. DAVIS AND CLARENCE A. BECKMAN, OF PORTLAND, OREGON.

MOTOR-VEHICLE GEAR-SHIFT LEVER AND LOCK.

1,402,841.  Specification of Letters Patent.  Patented Jan. 10, 1922.

Application filed June 29, 1920. Serial No. 392,758.

*To all whom it may concern:*

Be it known that we, ROY J. DAVIS and CLARENCE A. BECKMAN, citizens of the United States, residing at Portland, in the county of Multnomah and State of Oregon, have invented certain new and useful Improvements in Motor-Vehicle Gear-Shift Levers and Locks, of which the following is a specification.

This invention relates to an improved motor vehicle gear shift lever and lock and has as one of its principal objects to provide an arrangement wherein the gear shift lever of a vehicle may be secured against movement to thus prevent unauthorized use of the vehicle.

A further object of the invention is to provide a construction wherein the locking mechanism employed will be housed within the gear shift lever so as to thus be out of the way as well as normally inaccessible.

And the invention has as a still further object to provide a device which may be readily employed in lieu of conventional gear shift levers as now in common use.

Other and incidental objects will appear hereinafter.

In the drawings:

Figure 1 is a vertical sectional view of our improved gear shift lever and lock, Figure 2 is a fragmentary side elevation showing the closure plate of the ball of the lever removed, parts being broken away and shown in section, Figure 3 is a fragmentary side elevation, the ball being rotated substantially 180° from the position shown in Figure 2, Figure 4 is a transverse section through the ball of the lever, and Figure 5 is a view showing one of the bolt retracting springs of the device in detail.

In carrying the invention into effect, our improved lever is formed with a shank 10 upon the lower end of which is the usual toe 11 and formed on the lower end portion of the shank is a ball 2. At its upper end the shank carries a head or knob 13 which is threaded on the shank while, as particularly shown in Figure 1, a suitable pin is employed for locking the knob against displacement. Journaling the ball 12 is a socket plate 14 through which the lower end portion of the lever freely extends and threaded upon this plate is a socket nut 15 coacting with the plate to form a socket supporting the ball. Formed in the inner face of said nut, at diametric points, are recesses 16.

The ball 12 is, as particularly shown in Figure 4, formed internally with a recess 17 from which emerge diametric slots 18 opening through the periphery of the ball and extending transversely of the lower portion of said recess is a web 19. As will now be observed, the ball is formed of mating sections, one of which, or the body section, is integral with the shank 10 while the other section provides a closure plate 20 for the recess 17. As particularly shown in Figure 3, this plate is provided with lugs 21 fitting in the slots 18 to form corresponding side walls of said slots and detachably securing the plate in position is a cap screw 22 extending through the web 19 and threaded into the body section of the ball. Extending axially through the upper end portion of the shank 10 is a rotatable actuating rod 23, the lower end of which is journaled in a suitable recess in the web 19 of the ball and fixed to said rod within the recess 17 is a double ended cam 24 lying against the upper edge of said web. Slidable within the slots 18 of the ball to coact at their inner ends with said cam are bolts 25 in the lower edges of which are formed notches 26 and screwed or otherwise secured at their lower ends to the base of the web 19 are retracting springs 27, the upper ends of which freely engage in said notches and hold the bolts bearing at their inner ends against the cam. As particularly brought out in Figures 1 and 2 of the drawings, the lower end portions of the springs 27 are received in suitable recesses in the base portion of the web 19 and the side walls of these recesses will hold the springs in vertical position.

Fitted axially in the knob 13 of the lever is a lock 28. This lock may be of any approved type and includes a rotatable barrel 29 extending in alinement with the actuating rod 23 and lying flush at its upper end with the peripheral surface of the ball so that a key, as indicated at 30, may be readily inserted in the lock. Fixed to the upper end portion of the actuating rod is a disc 31 and swiveled upon the rod to coact with this disc is a second disc 32 coupled to the barrel 29 of the lock and provided with a depending lug 33 to ride in a suitable facial slot in the disc 31 so that a full turn of the lock in either one direction or the other will serve to rotate the actuating rod a quarter turn.

As will now be readily understood in view of the preceding description, when the cam is turned to inactive position, as shown in Figure 4, lying crosswise between the bolts 25, the springs 27 will hold the bolts retracted lying flush at their outer ends with the peripheral surface of the ball 12 so that the lever may be freely rocked within its socket for shifting the speed gears in the usual manner. On the other hand, by moving the lever to vertical position, the key 30, when inserted in the lock 28, may then be turned a full turn for rotating the cam 24 a quarter turn for projecting the bolts into the recesses 16 of the socket nut 15, the cam then lying in active position in alinement with the bolts so that the bolts will be securely held projected. As will be at once appreciated, when the bolts 25 are thus engaged in the recesses 16 of the socket nut, the lever will be securely locked against rocking movement so that shifting of the speed gears will be rendered impossible. Unauthorized operation of the vehicle will accordingly be effectually prevented. At the same time, the owner of the vehicle may readily insert the key 30 in the lock 28 and counter-rotate the lock barrel a full turn for again rotating the cam 24 to inactive position when the lever may be freely moved. We accordingly provide a particularly effective construction for the purpose set forth and a device which may be readily employed in connection with substantially any conventional design of motor vehicle.

Having thus described the invention, what is claimed as new is:

1. A gear shift lever including a lever shank provided with a journaling ball having an internal recess and formed of sections one providing a closure plate for said recess, a bolt carried by the ball, means housed by the ball within said recess normally holding the bolt retracted, and means mounted within the recess of the ball to coact with the bolt for projecting the bolt to lock the lever stationary.

2. A gear shift lever including a lever shank provided with a hollow sectional journaling ball having a slot opening through the periphery thereof, a bolt slidable in said slot, means within the ball to coact with said bolt for projecting the bolt, and means housed within the ball normally holding the bolt retracted.

3. A gear shift lever including a lever shank provided with a journaling ball having an internal recess therein, there being a web in said recess, a bolt extending from said recess, a spring secured at one end to the web and coacting at its opposite end with the bolt for holding the bolt retracted, a rotatable rod extending into the recess and journaled at its lower end upon said web, and means upon the rod within the recess to coact with the bolt for projecting the bolt.

4. A gear shift lever including a lever shank provided with a journaling ball having an internal recess therein, there being a web in said recess, a bolt extending from said recess and provided near its inner end with a notch, a leaf spring secured at one end to said web and engaging at its opposite end in said notch for holding the bolt retracted, the spring sustaining the bolt at its inner end portion, a rotatable rod extending into the recess and journaled at its lower end upon said web, and means upon the rod within the recess to coact with the bolt for projecting the bolt.

In testimony whereof we affix our signatures.

ROY J. DAVIS. [L. S.]
CLARENCE A. BECKMAN. [L. S.]